United States Patent [19]
Jones

[11] Patent Number: 5,957,321
[45] Date of Patent: Sep. 28, 1999

[54] FLY TYING KIT CONTAINER AND TYING STATION

[76] Inventor: Michael W. Jones, 4630 Willow La., Boise, Id. 83703

[21] Appl. No.: 09/094,907

[22] Filed: Jun. 10, 1998

[51] Int. Cl.⁶ .................................................. B65D 25/06
[52] U.S. Cl. .......................... 220/533; 220/832; 220/552; 220/23.86; 206/315.11
[58] Field of Search .................... 206/315.11; 220/23.83, 220/23.86, 23.87, 335, 334, 337, 533, 532, 552, 810, 831, 832, 836, 848

[56] References Cited

U.S. PATENT DOCUMENTS

| | | | |
|---|---|---|---|
| 1,644,830 | 10/1927 | Henderson | 220/552 |
| 3,258,017 | 6/1966 | Albert | 220/23.87 |
| 3,606,511 | 9/1971 | Henning et al. | 206/315.11 |
| 4,729,474 | 3/1988 | Lanius et al. | 206/315.11 |
| 4,932,548 | 6/1990 | Bensinger | 220/552 |
| 5,108,004 | 4/1992 | Baldwin | 220/23.86 |
| 5,302,014 | 4/1994 | Hobson | 312/249.12 |
| 5,366,071 | 11/1994 | Laszlo | 206/315.11 |
| 5,489,039 | 2/1996 | Brownlie et al. | 220/335 |
| 5,529,205 | 6/1996 | Corney et al. | 220/335 |
| 5,551,558 | 9/1996 | Bureau | 220/23.86 |
| 5,704,158 | 1/1998 | Whiteaker | 206/315.11 |

*Primary Examiner*—Stephen Castellano
*Attorney, Agent, or Firm*—Ken J. Pedersen; Barbara S. Pedersen

[57] ABSTRACT

A portable fly tying storage box and work station generally including an enclosure having a tying surface pivotably attached to the enclosure, with the tying surface defining an access to the enclosure and the tying surface being positionable in a closed position, an open position and a horizontal position. Multiple tying station setups are possible by placing the enclosure upright or on its rear side and opening the tying surface to the desired position then fixing the tying surface in place. The fly tying kit container and tying station further includes both fixed and adjustable dividers within the enclosure. The dividers are dimensioned and positioned with respect to the closed position of the tying surface to form a tray receiving volume between the dividers and the closed position of the tying surface. The fly tying kit container and tying station also includes a tray being closely received within the enclosure and supported therein by the enclosures dividers. The tray also contains both fixed and adjustable dividers.

11 Claims, 5 Drawing Sheets

FLY TYING KIT CONTAINER AND TYING STATION

BACKGROUND-FIELD OF THE INVENTION

This invention relates to portable work stations, and storage containers, used for creating fishing lures and flies.

The art of fly tying is a critical part of fly fishing. The closer the artificial lure looks to what the fish are interested in eating, the better the chance that a fish will give it a taste test. The most successful fly fishermen are those who can successfully observe nature, then react to and copy it as closely as possible. Fly fishermen study the life cycles of the whole food chain and how each part interacts with the other. To be successful the fly fisherman must create lures that imitate creatures in metamorphose or distress, such as those that fly or crawl swim or hatch. Nature is versatile and each new season and body of water has aquatic, and land creatures in numerous colors, shapes sizes and stages of development. Just as the lures in nature change, it is advantageous to the fly fisherman to change the artificial lures used.

It is of great benefit to the fly fisherman to have an extensive fly tying kit available on a fishing trip, especially if "the one that got away" took the last killer artificial fly with it, or the fish are biting on a bug that isn't even close to any lures they have.

A variety of methods and devices exist that attempt to fill this need, but are often inadequate under many circumstances. For example, the tote bag for fly tying equipment and materials of U.S. Pat. No. 5,052,555 appears to have a large material and tool capacity. However the tools and materials are not visible or easily accessible, they are hidden behind zippers and closures. Chemicals such as glue and floatant are not kept upright, allowing the possibility of leakage. The soft bag does not provide adequate protection under many circumstances for delicate and expensive materials such as large rooster necks that can cost in excess of $200.00 each. The tote bag also does not provide a work surface or a place to mount a tying vice.

The combined workbench and carry case of U.S. Pat. No. 5,366,071 is fascinating and very complex. It has many moving parts and is most likely quite expensive to make. Its complexity, unfortunately, uses up much of its potential storage space. The chemical containers such as glue and floatant are turned on their sides during transport and possibly during storage, thus having a potential for leakage.

The table and cabinet combination for fly tying of U.S. Pat. No. 4,894,581 and the cart for tying fishing lures of U.S. Pat. No. 5,302,014 appear to be efficient units for home use. They are quite large, require a lot of storage space and are generally not portable enough to take camping.

Some fly fisherman use common fishing tackle boxes to carry their fly tying tools and materials in. Unfortunately, very few of the supplies required by a fly tier safely fit in the compartments of these boxes. There is still a need for alternative fly tying kits.

SUMMERY OF THIS INVENTION

The fly tying kit container and tying station of the present invention is a practical, simple and efficient solution to the need for a portable fly tying kit. The main enclosure, or box, and tray compartments are adjustable to efficiently fit and protect the user's tools and materials. The box compartments are made to hold most tying materials in the clear plastic pouches the tying materials are generally purchased in. The approximate outside dimensions of one embodiment of the kit in its closed position is approximately 12"×12"×15". Therefore, the kit is relatively compact and yet the kit's storage capacity is quite large. There are numerous possible divider setups for both the tray and the box. Following are the material holding capacities for just two possible embodiments of the many box divider setups. Both divider setup options listed form nine compartments.

In a first embodiment, the kit capacity permits: 5 each, large rooster necks in sizes up to 8"×14.6", a combination of 100 types of chenille, mohair, yarn and lead etc., and 110 each standard sized material packages of approximate size (4"×8") including fur, hair, rooster necks, feathers, dubbing synthetics, etc.

In another embodiment, the kit capacity allows: 12 each, large rooster necks, a combination of 70 types of chenille, mohair, yarn and lead, and 110 each standard sized material packages.

In addition, the tray in the kit is capable of holding a combination of 70 or more spools of thread, tinsel, floss and lead, 3 or more full sets of tying tools such as vices, scissors, bobbins, pliers, tweezers etc., and 50 or more hook types, glue, floatant, wax, permanent markers, etc.

The main enclosure or box of the present invention comes with a minimum of 1 permanent divider and 8 adjustable dividers, allowing at least 13 compartments. The tray comes with a minimum of 2 permanent dividers and 3–4 adjustable dividers, allowing between 3 and 8 compartments. The adjustable tray dividers allow compartment set ups that keep chemicals such as glue and floatant in an upright position. The tray compartments allow separation of delicate and heavy tools. The tray compartment contents are fully visible and accessible in a tying station setup. The box compartments allow similar material types to be grouped together. The box compartments are open and accessible in a tying station setup. The user may simply remove a whole compartment of materials with one hand, and fan them out similar to a hand of cards. The user then removes the plastic envelope containing the material type wanted and returns the rest of the envelopes to their compartment.

The present invention is capable of a variety of tying station setups. The lid serves as a vice mount and tying surface, regardless of where the kit is situated. For example, it doesn't matter whether the kit sits on a coffee or end table, a dining or picnic table, a chair, a stump or the ground. Alternatively, the lid may also be folded out of the way if there is a good alternate tying surface available. The kit container may easily be transported, for example to a friend's house, or tying lessons, or the mountains, and two people may comfortably use the kit at the same time in most circumstances.

DETAILED DESCRIPTION

In the following description of the various figures the term top surface 2T (FIG. 1) is the surface formed by the top of the lid 2 in its closed position. The front 1F (FIG. 1) of the box 1 is the surface on which latches 10 are mounted. The bottom 1Z (FIG. 5) of box 1 is the side opposite the top 2T of the box 1, and the rear or back side 1R (FIG. 5) of the box 1 is the side opposite the front 1F of box 1.

Figure 1:
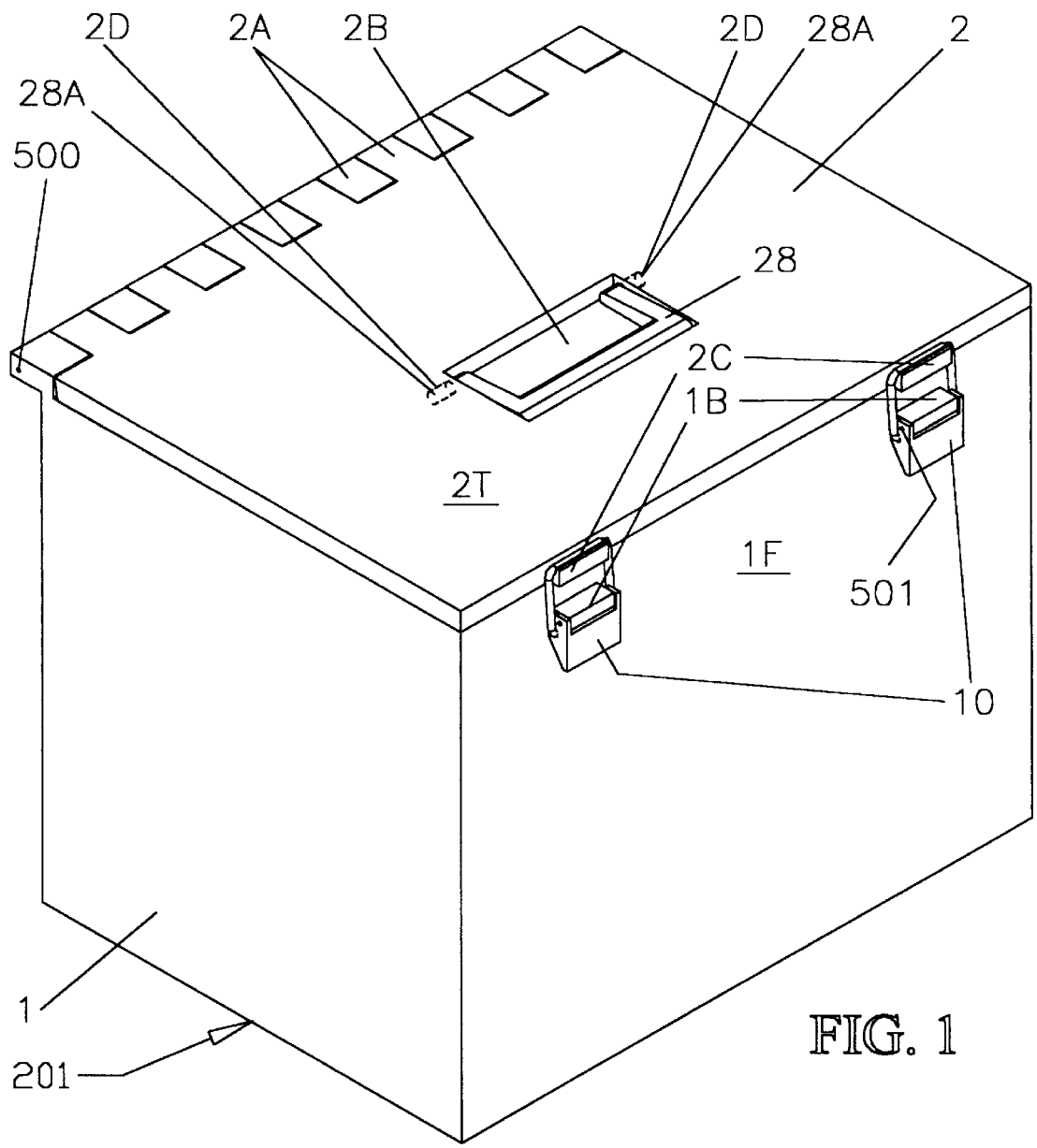
FIG. 1 is a perspective view of the invention showing the closed position.

FIG. 1 shows one embodiment of fly tying kit container and tying station 201 in its closed position. Lid 2 is hingedly attached to enclosure or box 1. Lid hinge 2A is made up of interlocking notches formed in both box 1 and lid 2. A lid hinge pin 500 passes through aligned holes in both sets of notches, thus attaching them and providing a pivot point for hinge 2A. Lid hinge 2A allows lid 2 to rotate in excess of 265 degrees in relation to box 1.

Lid 2 has a handle recess 2B in its top surface. Handle receiving recess 2B has two handle mount holes 2D on opposing sides of recess 2B. A semi-rigid plastic handle 28 mounts in recess 2B. Two handle ends 28A are squeezed toward each other, then placed in handle mount holes 2D. Handle 28 then expands into place. Handle 28 is able to fold below the top surface 2T of lid 2 after it is in place.

Box 1 has one or more latch mounts 1B formed on its upper front side 1F. A latch 10 is attached by inserting a pin 501 through an aligned hole in latch mount 1B and latch 10. Lid 2 has one or more latch catches 2C formed on its front edge. Catches 2C are placed such that when lid 2 is latched nothing protrudes above top 2T of lid 2. Top 2T of lid 2, as shown in FIG. 1, forms a flat durable surface with no upward protrusions. This flat surface allows other items to be safely stacked on top of lid 2 if desired, for example when the user stores kit 201 or takes it on a camping trip.

Figure 2:
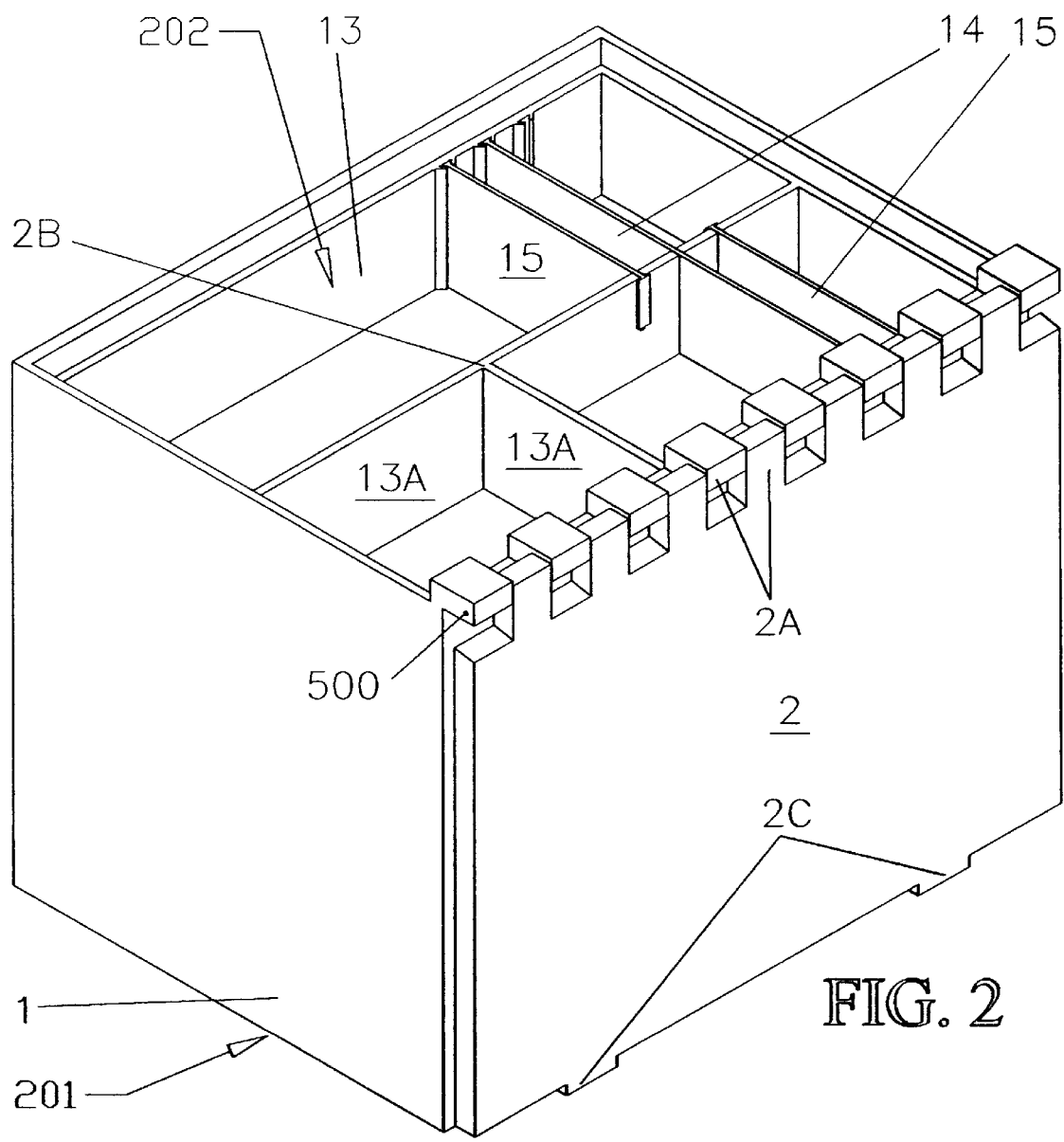
FIG. 2 is a perspective view of the invention showing the lid opened and the removable tool and accessory tray in a storage position.

FIG. 2 shows the fly tying kit assembly 201 with lid 2 open to its furthest extreme. Removable tray assembly 202 is shown in its stored position. In some cases, tray assembly 202 is used in this or a similar position. There is sufficient room on top or beneath tray assembly 202 for additional storage, ample enough to store a fly tying book or other items.

Figure 3:
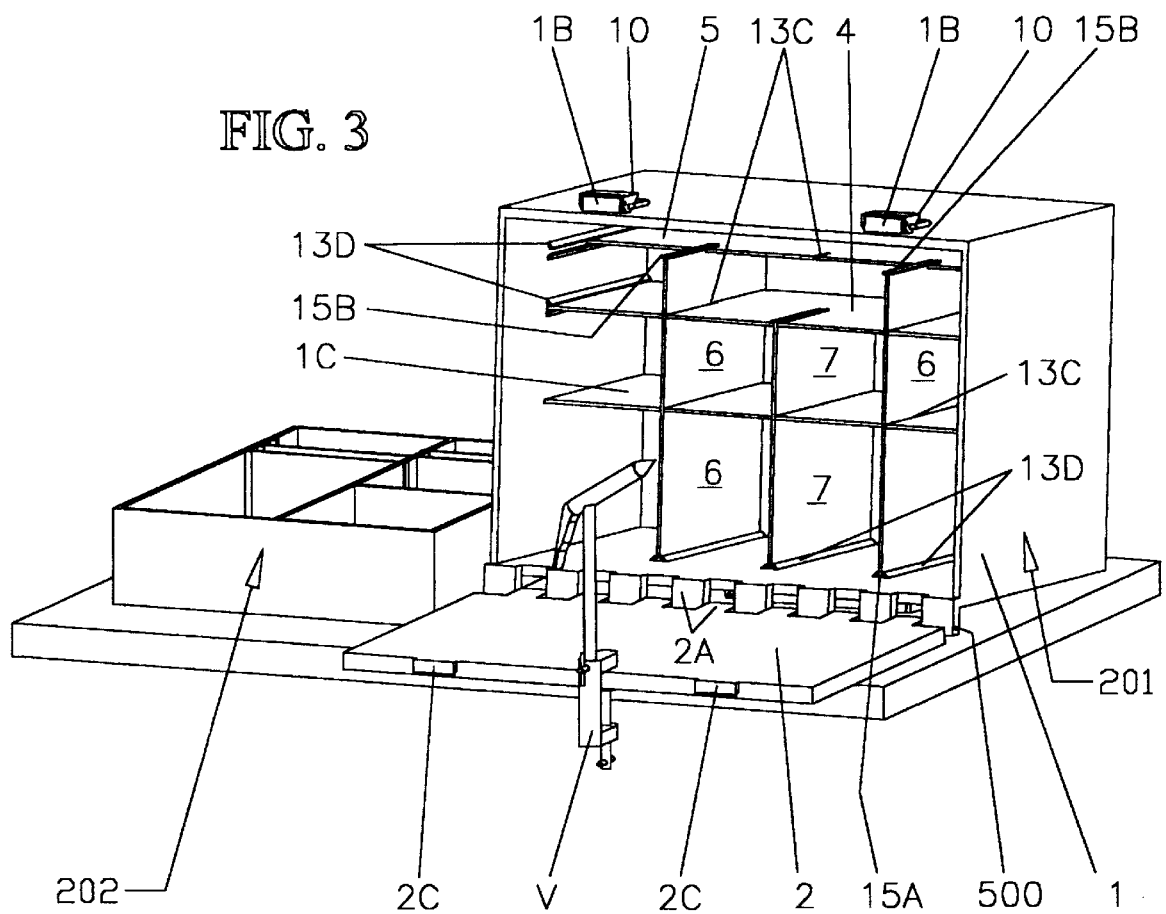
FIG. 3 is a perspective view of the invention showing the kit in one of its optional tying station setups.

FIG. 3 shows fly tying kit container 201 in a useful tying station setup. This setup may typically be used, for example, with a dining or picnic table or a flat surface that is similarly higher that the user's chair. Box 1 lays with its rear side 1R toward the table. Lid 2 is open and resting on the table. The material compartments formed by box dividers 4, 5, 6, 7 and 1C are visible to the user. The contents of tray assembly 202 are also visible in this configuration. Lid 2 protrudes beyond the edge of the table to allow one or more standard fly tying vices V (which are not part of the claimed invention) to be securely mounted to any of the protruding edges of lid 2. Box 1 has one permanent box divider 1C. Kit container 201 also contains a minimum of eight slidably mounted box dividers 4, 5, 6, and 7 in a minimum of four different sizes. The dividers can be arranged in numerous configurations to form custom sized storage compartments that fit the user's tying materials such as feathers, fur, hair, yam etc.

Figure 6:
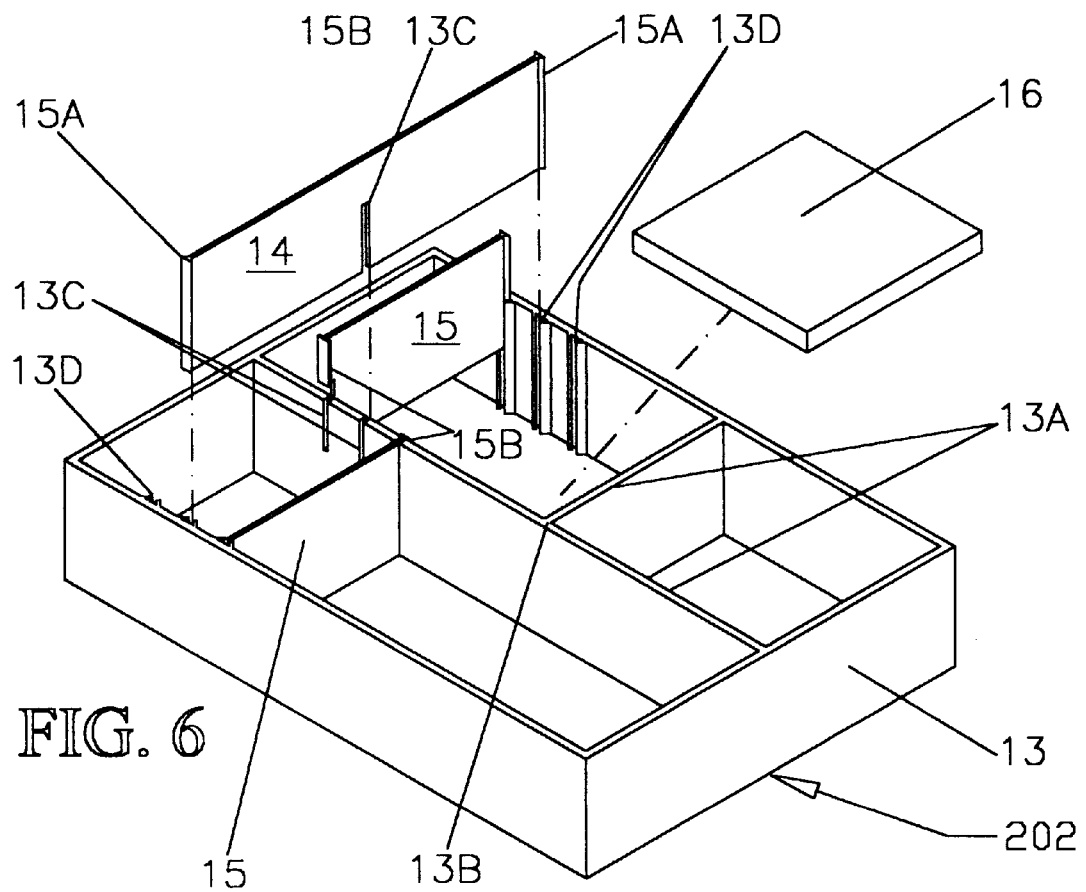
FIG. 6 is a partially exploded perspective view of the tray assembly of the invention.
Figure 6A:
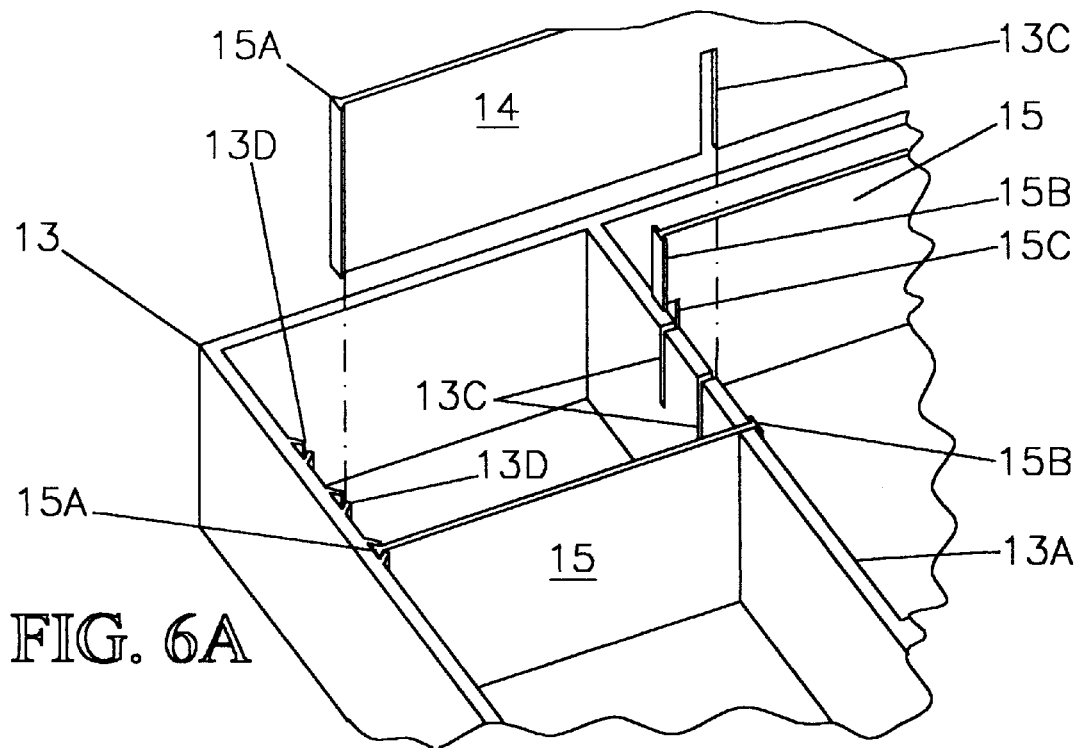
FIG. 6A is a detail view of FIG. 6

The method used for mounting and interlocking dividers 4 through 7 is shown in FIG. 6A, and is explained elsewhere in this description. Many of the divider details, however, are also shown in FIG. 3.

All of box dividers 1C and 4 through 7 have a plurality of interlocking slots 13C to allow dividers 1C and 4 through 7 to cross one another, and sit flush with the inside bottom of box 1. Box dividers 1C, 4, 6 and 7 also support tray assembly 202 in its storage position as shown in FIG. 2. Box 1 has a multiplicity of female dovetail slides 13D along its inside walls. Box dividers 4 through 7 have a mating male dovetail 15A that slides into the female dovetail slides 13D to secure dividers 4 through 7 in place. Medium box divider 6 and small box divider 7 have a male dove tail 15A on one end and a "T" end 15B on the opposing end. The "T" end 15B provides a method of fastening the end of medium box divider 6 or small box divider 7 to the divider interlocking slot 13C of large, tall box divider 4, or large, short box divider 5.

Large, short box divider 5 as shown in FIG. 3 forms the lower wall of a long skinny compartment normally intended for large items, for example expensive rooster necks. Large, short box divider 5 is shorter than the other dividers to allow more finger room when this very narrow compartment set up is used.

Figure 4:
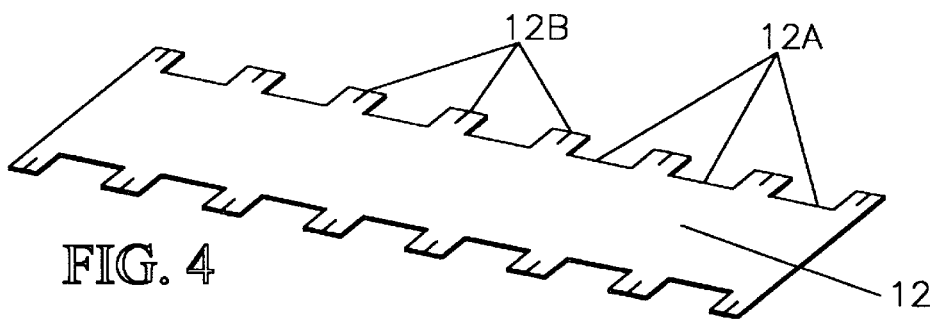
FIG. 4 is a perspective view of an optional winder for use with the invention.

FIG. 4 is an optional flat spool designated as winder 12. Winder 12 has a multiplicity of recesses 12A on which tying material such as yarn, chenille, mohair, lead, and other large string like material may be wrapped. Winder 12 also has a plurality of slits 12B suitable for holding the loose ends of the tying material and preventing them from unwinding. Slits 12B may also hold short pieces of unused material that are too short to be rewrapped onto winder 12. Winder 12 allows the user to keep similar materials together. Fly tying kit assembly 201 may include a plurality of winders 12. Winder 12 has dimensions that fit within box compartments formed by dividers 1C and 4, through 7.

Figure 5:
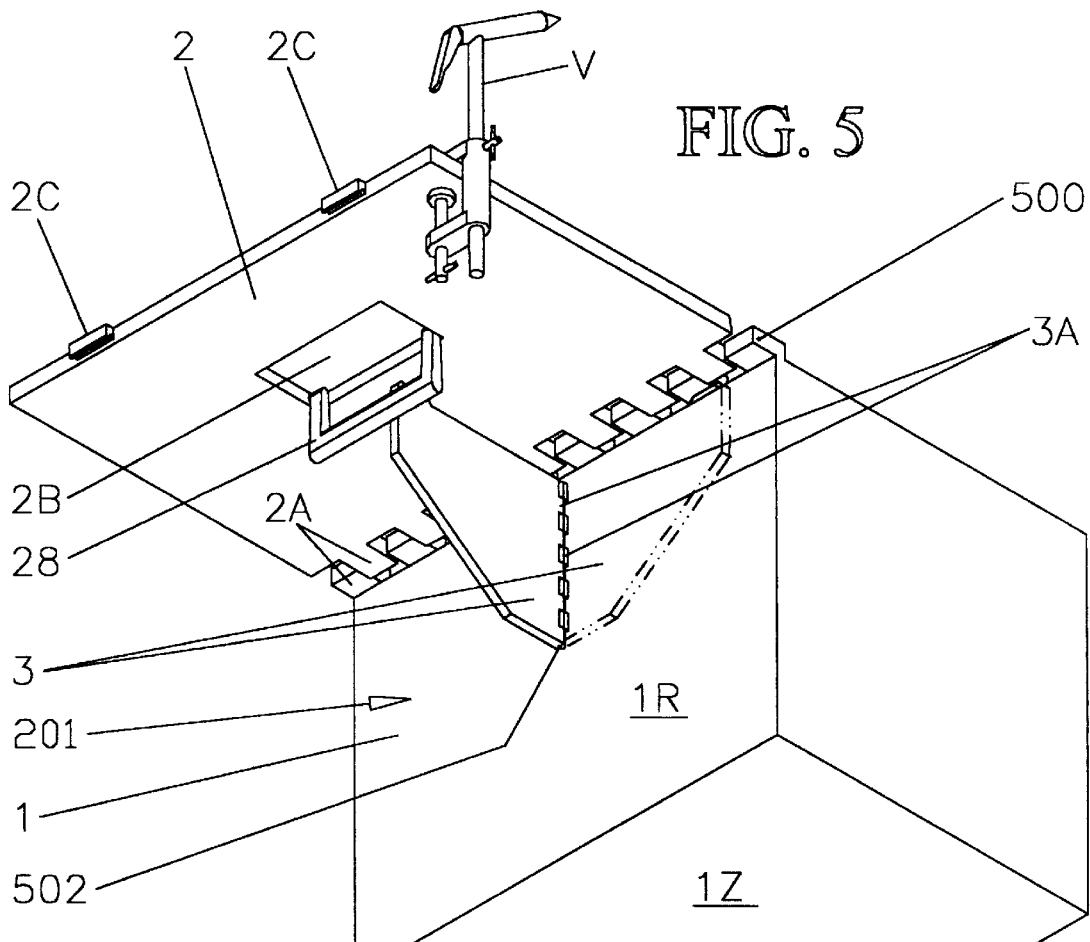
FIG. 5 is a perspective bottom rear view of the invention in one of its tying station setups, showing the lid support in use when an elevated tying surface is required.
Figure 5A:
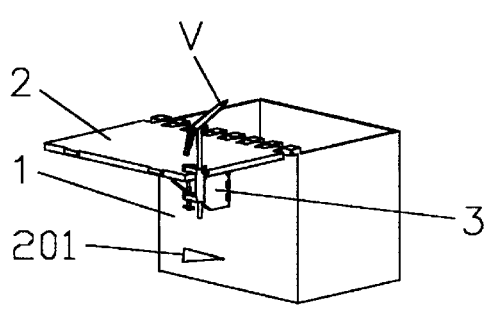
FIG. 5A is a perspective side view of the invention in the same setup as shown in FIG. 5.

FIG. 5A is a perspective view of fly tying kit container and tying station 201, shown in an upright tying station set up. Here, bottom 1Z of box 1 sits on a surface of approximately the same height as a user's chair. Kit container 201, as shown, may sit with bottom 1Z of box 1 on a surface, such as a coffee or end table, tree stump, a chair, or even the ground. In this use, lid 2 would extend over the users lap either in front of or beside the user, to form a tying table. Tying vice V may be used with kit 201 and may be fastened to one of the non-hinged edges of lid 2 in a convenient position for use.

FIG. 5 is a perspective bottom rear view of fly tying kit container 201. Kit container 201 is in the same tying station setup as shown in FIG. 5A. In a typical use of this set up, bottom 34 is not visible. This view shows outside bottom 1Z of box 1 to better demonstrate how the upright tying station works. Lid 2 is held in a tying surface position by support arm 3. Support arm 3 is hingedly attached to the rear of box 1. Support hinge 3A is made up of interlocking notches formed in both box 1 and support arm 3. A pin 502 passes through aligned holes in both sets of notches, thus attaching the notches and providing a pivot point for hinge 3A. Support arm 3 is capable of approximately 180 degrees of movement. Support arm 3 as shown in FIG. 5 pivots into a position to support lid 2. Alternately, arm 3 pivots parallel to the rear wall of box 1 to allow kit container 201 to be used in the possible optional positions shown in FIGS. 2 and 3.

Lid hinge pin 500 is offset allowing lid 2 to drop slightly as lid 2 rotates from the closed position of FIG. 1 to the open position shown in FIGS. 5 and 5A. The offsetting of pin 500 allows support arm 3 free movement under lid hinge 2A, and also allows lid 2 to be supported parallel to the ground when in use in the position shown in FIGS. 5 and 5A.

FIG. 6 is a perspective and partially exploded view of removable tray assembly 202. FIG. 6A is an enlarged detail drawing of FIG. 6. FIG. 6A is intended to demonstrate how adjustable tray dividers 14 and 15 mount and interlock. Tray 13 has two fixed position tray dividers 13A. In use, tray 13 is lifted at lift junction 13B of tray dividers 13A. Tray assembly 202 also contains at least two sizes of slidably mounted tray dividers 14 and 15. Slidable dividers 14 and 15 can be arranged in a plurality of configurations to form custom sized storage compartments to accommodate a variety of tools and accessories. Tray assembly 202 may hold, for example, tying vices, markers, glue, floatant, wax, hooks, finished flies, scissors, files, knot tiers, thread, bobbins etc.

One of fixed position tray dividers 13A optionally has several interlocking slots 13C. Slots 13C interlock with large tray divider 14. Interlocking slots 13C also interlock with "T" 15B and the "T" recess 15C of small tray divider 15. Tray 13 has a plurality of female dovetail slides 13D along its inside walls. Large divider 14 and short divider 15 have a mating male dovetail 15A that slides into female dovetail slides 13D to secure the dividers in place.

A semi-flexible piece of packing material such as a dense cell foam may optionally be included with tray assembly 202. Foam piece 16 is useful in a thickness of approximately ½ inch and can easily be cut with a pair of scissors to fit the desired divider set up. Foam piece 16 fits snugly in the bottom of any tray compartment and is used to hold tools in an upright position. The tools can either be stabbed into foam 16 or the tools can be wedged between the edge of the foam and a wall of the tray 13. Foam piece 16 advantageously provides safe storage and easy access to tools such as files, razor blades, picks, scissors and the like.

Whereas particular embodiments of the invention have been described hereinabove, for purposes of illustration, it will be evident to those skilled in the art that numerous variations of the details may be made without departing from the invention as defined in the appended claims.

The apparatus of the present invention is not limited to the descriptions of specific embodiments presented hereinabove, but rather the apparatus of the present invention should be viewed in terms of the claims that follow and equivalents thereof. Further, while the invention has been described in conjunction with several such specific embodiments, it is to be understood that many alternatives, modification, and variations will be apparent to those skilled in the art in light of the foregoing detailed descriptions. Accordingly, this invention is intended to embrace all such alternatives, modifications, and variations which fall within the spirit and scope of the appended claims.

I claim:

1. A fly-tying storage and work station adaptable for use in an upstanding position and in a rearwardly-tipped position, the station comprising:

an enclosure surrounding and defining an interior space and having a bottom wall, a front wall, a rear wall having a top edge and a bottom edge, and two side walls extending up perpendicularly from the bottom wall, and a top opening into the interior space;

a protrusion extending perpendicularly out from the rear wall near the rear wall top edge, the protrusion having an outer end;

a lid pivotally attached to the protrusion near the outer end, the lid having an inner surface and an outer surface, and the lid being pivotal to a closed first position extending across the top opening with the inner surface facing the interior space, pivotal to a second position extending out from the enclosure generally parallel to the rear wall, and pivotal to a third position extending outward from the enclosure generally parallel to the bottom wall;

a plurality of dividers received in the interior space, some of said dividers being parallel to the rear wall and some of said dividers being parallel to the two side walls, the dividers dividing the interior space into deep elongated compartments having lengths, widths and depths, the lengths of the deep elongated compartments aligned perpendicularly to the bottom wall; and a support for use when the station is resting on the bottom wall in an upright position, the support being connected to the rear wall of the enclosure and having a support surface parallel to the bottom wall and contacting the lid outer surface when the lid is in the third position and holding the lid parallel to the bottom wall so that the lid inner surface is horizontal and upward facing for serving as a fly tying work surface; and wherein, when the station is tipped rearwardly onto a horizontal surface and the lid is pivoted into the second position, the lid outer surface and the rear wall bottom edge contact the horizontal surface and the lid outer surface and the bottom edge are coplanar on a horizontal plane, the rear wall and the elongated compartments lie at an acute angle to said horizontal planc, so that the elongated compartments slant upwards for viewing through the enclosure top opening, and the lid inner surface faces upwards for serving as a fly tying work surface.

2. A station as in claim 1, further comprising a fly-tying vice connected to the lid and extending up from the lid inner surface when the lid is pivoted to the second position and to the third position.

3. A station as in claim 1, wherein the support is fixedly and pivotally attached to the enclosure, so that the support is pivotal to lie flat against the rear wall.

4. A station as in claim 1, wherein the support is removable.

5. A station as in claim 3, wherein the lid is pivotal to a fourth position parallel and near to the rear wall.

6. A station as in claim 4, wherein the lid is pivotal to a fourth position parallel and near to the rear wall.

7. A station as in claim 1, further comprising a removable tray received within the interior space between the elongated compartments and the lid when the lid is in the first position.

8. A station as in claim 1, wherein the front wall and two side walls have top edges and bottom edges, wherein the rear, front and side wall edges form an enclosure top rim, wherein the dividers extend from the bottom wall part way up to said enclosure top rim, and the station has a tray-receiving space between the dividers and the lid inner surface when the lid is in the first position, wherein a tray is received in the tray-receiving space.

9. A station as in claim 1, wherein the two side walls are a given distance apart, and wherein the station further comprises a divider received in the interior space parallel to the front wall and extending between the two side walls for forming a wide compartment extending substantially the entire distance between the two side walls.

10. A station as in claim 8, wherein the two side walls are a given distance apart, and wherein the station further comprises a divider received in the interior space parallel to the front wall and extending between the two side walls for forming a wide compartment extending substantially the entire distance between the two side walls.

11. A station as in claim 1, wherein the lid further comprises a handle-receiving recess on the outer surface of the lid and a handle pivotally connected to the lid in the handle-receiving recess, wherein the handle is adapted to pivot to be entirely in the handle-receiving recess so that it does not protrude out beyond the outer surface of the lid.

* * * * *